March 18, 1969 R. R. NORLEY 3,433,993

TIME SWITCH CONTROLLED ENERGIZING CIRCUIT FOR AUTOMATIC DEGAUSSING APPARATUS

Original Filed May 24, 1965

INVENTOR.
RONALD R. NORLEY
BY
W. H. Sprouagle
Attorney

United States Patent Office 3,433,993
Patented Mar. 18, 1969

3,433,993

TIME SWITCH CONTROLLED ENERGIZING CIRCUIT FOR AUTOMATIC DEGAUSSING APPARATUS

Ronald R. Norley, Indianapolis, Ind., assignor to Radio Corporation of America, a corporation of Delaware Continuation of application Ser. No. 457,966, May 24, 1965. This application Dec. 15, 1967, Ser. No. 708,741
U.S. Cl. 315—8 4 Claims
Int. Cl. H01j 29/06

ABSTRACT OF THE DISCLOSURE

In a television receiver a degaussing coil which, upon closure of a power switch, is connected for energization by the charging current for the low voltage power supply filter capacitors is subsequently disconnected and power is applied to the television receiver by a thermally operated time delay switch connected to the power supply.

Figure 1:
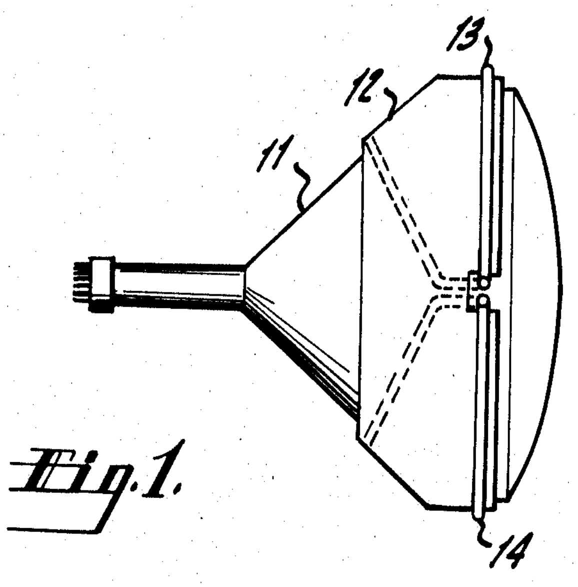

This invention relates to the automatic degaussing apparatus used in color television receivers and particularly to a control circuit for energizing the coil structure of such apparatus. This application is a continuation of my copending application, Ser. No. 457,966, filed May 24, 1965, now abandoned.

In a shadow mask type of color picture tube the metallic mask and its supporting structure together with other metallic parts of the tube are subject to being magnetized in various ways such as in shipment to, and continued use in, a consumer's home. Such undesired magnetization is caused by bringing the picture tube into proximity with magnetizing fields associated with structures such as trucks, elevators and the like and also by exposure during use to influences such as the earth's magnetic field. Such random magnetization often adversely affects the performance of a color television receiver in which the picture tube is embodied.

The remedy for such magnetization is either a manual degaussing of the apparatus by a skilled serviceman or an automatic degaussing by the provision of suitable apparatus such as in some receivers manufactured in recent years. Relocation or reorientation of the apparatus in a consumer's home also frequently requires degaussing in order to effect optimum performance in the new position. Such a function is performed automatically in some of the more recently produced receivers.

Automatic degaussing of a color television picture tube usually is accomplished by providing a coil structure suitably placed relative to the picture tube so that the field produced thereby encompasses the shadow mask and its supporting structure in the picture tube. Such a coil structure is energized by alternating current which initially has a substantial magnitude but which subsequently is gradually diminished to a relatively low magnitude. Circuits for energizing such a coil structure in many of the receivers recently produced employ components such as thermistors and varistors so as to effectively disconnect the coil structure from the source of alternating current after the energizing current reaches its relatively low magnitude. Such circuits have generally proved to be satisfactory although the energizing current is limited to a certain extent by the use of the described components. The nature of these circuits, also, is such that a cooling off period of at least 5 minutes is required in order that they be completely effective when the receiver is next switched on. This latter limitation is particularly disadvantageous in portable color television receivers where the location and/or orientation of the receiver is subject to frequent change.

An object of the present invention, therefore, is to provide an improved circuit for energizing the automatic degaussing apparatus of a color television receiver.

The coil structure of the automatic degaussing apparatus, in accordance with this invention, is connected so as to be traversed by all of the alternating current supplied to the power supply rectifier and its associated filter. This alternating current initially has a relatively large magnitude which subsequently diminishes to a relatively low value when the filter capacitors have received their charging current. The energizing circuit also includes a time delay switch, which, for example, may be thermally operated in which case its heater element may be traversed by the alternating current supplied to the heater elements of the electron tubes embodied in the receiver. By the time the alternating current resulting from the filter capacitor charging operation has diminished to a relatively low magnitude, the switch is activated to effectively disconnect the coil structure of the degaussing apparatus from the circuit by which it was energized. The switch also, in one embodiment of the invention, completes the circuit or circuits for supplying voltage to the anodes and other electrodes of the electron tubes and to other circuit elements in the receiver.

Figure 2:
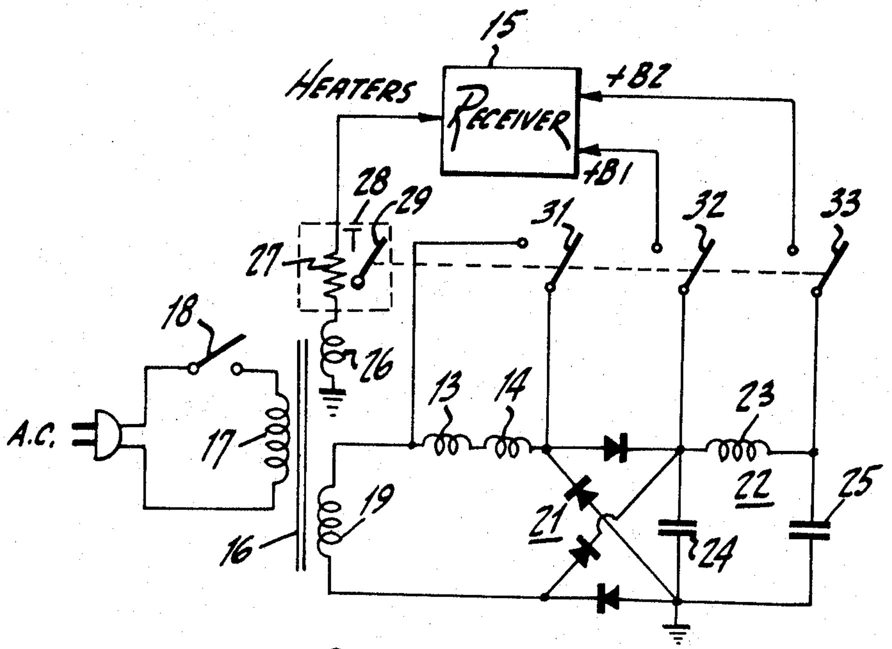

For a better understanding of the invention reference now will be made to the following description which is taken in conjunction with the accompanying drawing, of which:

FIGURE 1 is a view of a color television picture tube provided with a typical degaussing apparatus; and FIGURE 2 is a schematic circuit diagram of the apparatus in accordance with the invention by which the coil structure of the degaussing apparatus is energized.

In FIGURE 1 the color picture tube 11 is provided with a magnetic shield 12 made of ferrous metal. This shield is mounted so that it surrounds the picture tube in the region in which the shadow mask and its supporting structure is located. A pair of coils 13 and 14 is mounted on the shield 12 substantially in the manner shown so that the forward portions of the coils encircle the shield 12 on the outside and the rear portions of the coils are disposed on the inside of the shield. It is to be understood that the energizing circuit of the invention is not limited to use with the particular configuration of the shield 12 and the coils 13 and 14 chosen herein for illustration. Other shield configurations and coil structures may be used in conjunction with the present invention.

FIGURE 2 shows schematically the degaussing coils 13 and 14 connected in the low voltage power supply circuit for a color television receiver 15. It will be understood that the receiver 15 includes all of the apparatus and circuit components such as electron tubes or equivalent devices for producing a color television picture on an image reproducing device such as the color picture tube 11 of FIGURE 1. The low voltage power supply includes a transformer 16 having a primary winding 17 which is connectable by a power switch 18 to a source of alternating current energy as indicated. The power transformer 16 also has a secondary winding 19, the terminals of which are connected to a full wave rectifier 21. One of the connections between the secondary winding 19 and the rectifier 21 includes the degaussing coils 13 and 14. A filter 22 is connected to the output terminals of the rectifier 21 and includes a series connected choke coil 23 and shunt connected capacitors 24 and 25 connected respectively to the terminals of the choke coil 23. Except for the inclusion of the degaussing coils 13 and 14 in the described circuit of the low voltage power supply this apparatus is entirely conventional.

A tertiary winding 26 provided on the power transformer 16 supplies current to the heaters of the electron tubes included in the television receiver 15 in the usual manner. In this case, however, the heating element 27 of a thermally operated switch 28 is included in the circuit extending between the tertiary winding 26 and the electron tube heaters. This switch is of a type that a mechanically movable element 29 is actuated from an inoperative position as shown to an operative position when the heating element 27 has reached a predetermined temperature. Mechanically linked to the element 29 are three switches 31, 32 and 33. When the thermal switch 28 is operated, the switch 31 short circuits the degaussing coils 13 and 14 and the switches 32 and 33, respectively, connect two different voltages +B1 and +B2 to the receiver circuits as indicated.

The apparatus of the circuit of FIGURE 2 operates in the following manner: Assume that the receiver is not operating and it is desired to place it in operation for the reproduction of a television picture. The switch 18, which may be the on-off switch of the receiver, is closed to apply alternating current to the transformer primary winding 17. Prior to the closure of switch 18 the filter capacitors 24 and 25 are in a completely discharged state. As soon as the switch 18 is closed, the alternating current voltage induced in the secondary winding 19 is rectified by the rectifier 21 and provides a unidirectional charging current for the filter capacitors 24 and 25. Since these capacitors are initially completely discharged, there is an initial surge of charging current through these capacitors. This surge of current causes a corresponding surge of alternating current through the power transformer seconday winding 19 and the degaussing coils 13 and 14. This alternating current, in traversing the degaussing coils 13 and 14, is of relatively large magnitude which is required to produce the start of the degaussing operation. The filter capacitors 24 and 25 soon become charged, thereby reducing the magnitude of the alternating current derived from the winding 19. The resultant current through the degaussing coils 13 and 14, thus, is reduced to a relatively small manitude.

As soon as the switch 18 is closed, the alternating current voltage induced in the tertiary power transformer winding 26 produces a current flow to the heaters of the electron tubes of the receiver 15. The heating element 27 of the switch 28 begins to heat and by the time it reaches a temperature sufficient to actuate the member 29 and the switches 31, 32, 33, the alternating current through the degaussing coils 13 and 14 will have diminished to the relatively low magnitude described. The degaussing operation having been completed at this point, the coils 13 and 14 are effectively disconnected from the energizing circuit by the closure of the switch 31. The closure of switches 32 and 33 place the receiver 15 in condition for complete operation. The circuit which disconnects the B+ voltages from receiver during the degaussing operation provides the advantage of insuring that the current through the degaussing coils 13 and 14 will decay to a low enough value to be effective.

It has been found that the described circuit is effective to produce a satisfactory degaussing of a color television receiver so as to render it substantially free of the effects of any extraneous magnetizing influences such as the earth's magnetic field. It also has been found that, when the receiver is turned off by the opening of switch 18, for example, capacitors 24 and 25 discharge in a relatively short time. Also, the thermally operated switch 28 requires only a fraction of the time (e.g. approximately one minute) to cool as compared to the thermistors included in other previously used circuits. As a result, the receiver may be turned off and turned on again within a relatively short time and the automatic degaussing apparatus will function effectively each time it is turned on. It will be understood that other types of switches may be used to perform the functions of the switch 28. As an alternative, for example, a mechanically or electrically timed switch which is reset each time the receiver is turned off has the advantage that the receiver need be turned off only long enough to discharge the filter capacitors 24 and 25 before another degaussing operation may be started.

What is claimed is:

1. In a television receiver embodying a picture tube and a degaussing coil structure mounted in such relation to said picture tube as to produce when energized a magnetic field within said tube, apparatus for energizing said coil structure, comprising:

a power supply for said receiver including rectifier means for converting alternating current into direct current and capacitive means for filtering said direct current;

means including a transformer having a primary winding, a secondary winding and a tertiary winding;

means connecting said coil structure in circuit with said transformer secondary winding and said rectifier means;

means including a power switch which when closed impresses alternating current upon said transformer primary winding, whereby to impress upon said coil structure alternating current having a relatively large initial magnitude and which diminishes to a relatively small magnitude caused by the charging current for said capacitive filtering means;

a time delay switch having an operating element connected to said tertiary transformer winding, whereby to cause a time-delayed operation of said time delay switch after closure of said power switch; and contact means on said time delay switch for effectively disconnecting said coil structure and for connecting said power supply to said receiver upon operation of said time delay switch.

2. In a television receiver embodying a picture tube, a plurality of signal processing electron tubes and a degaussing coil structure mounted in such relation to said picture tube as to produce when energized a magnetic field within said tube, apparatus for energizing said coil structure, comprising:

a power supply for said receiver including rectifier means for converting alternating current into direct current and capacitive means for filtering said direct current;

means including a transformer having a primary winding, a secondary winding and a tertiary winding;

means connecting said coil structure between said transformer secondary winding and said rectifier means;

means including a power switch which when closed impresses alternating current upon said transformer primary winding, thereby impressing upon said coil structure alternating current having a relatively large initial magnitude and which diminishes to a relatively small magnitude caused by the charging current for said capacitive filtering means;

a time delay switch having an operating element connected between said transformer tertiary winding and the cathode heaters of said electron tubes, whereby to cause a time-delayed operation of said switch after closure of said power switch; and contact means on said time delay switch for effectively disconnecting said coil structure and for connecting said power supply to said receiver upon operation of said time delay switch.

3. In a television receiver embodying a picture tube, a plurality of signal processing electron tubes and a degaussing coil structure mounted in such relation to said picture tube as to produce when energized a magnetic field within said tube, apparatus for energizing said coil structure, comprising:

a power supply for said receiver including rectifier means for converting alternating current into direct current and capacitive means for filtering said direct current;

means including a transformer having a primary winding, a secondary winding and a tertiary winding;

means connecting said coil structure in series between said transformer secondary winding and said rectifier means;

means including a power switch which when closed impresses alternating current upon said transformer primary winding, thereby impressing upon said coil structure alternating current having a relatively large initial magnitude and which diminishes to a relatively small magnitude caused by the charging current for said capacitive filtering means;

means including the heating element of a thermally controlled switch connected in series between said transformer tertiary winding and the cathode heaters of said electron tubes, whereby to cause a time-delayed operation of said thermally controlled switch after closure of said power switch; and contact means on said thermally controlled switch for short-circuiting said coil structure and for connecting said power supply to said receiver upon operation of said thermally controlled switch.

4. In a television receiver embodying a picture tube and a degaussing coil structure mounted in such relation to said picture tube as to produce when energized a magnetic field within said tube, apparatus for energizing said coil structure, comprising:

a power supply for said receiver including rectifier means for converting alternating current into direct current and capacitive means for filtering said direct current;

means including a transformer having at least a primary winding and a secondary winding;

means connecting said coil structure in circuit with said transformer secondary winding and said rectifier means;

means including a power switch which when closed impresses alternating current upon said transformer primary winding, whereby to impress upon said coil structure alternating current having a relatively large initial magnitude and which diminishes to a relatively small magnitude caused by the charging current for said capacitive filtering means;

a time delay switch having an operating element connected to one of said transformer windings, whereby to cause a time-delayed operation of said time delay switch after closure of said power switch; and contact means on said time delay switch for effectively disconnecting said coil structure and for connecting said power supply to said receiver upon operation of said time delay switch.

References Cited

UNITED STATES PATENTS

| | | | |
|---|---|---|---|
| 3,249,795 | 5/1966 | Dietch | 315—8 |
| 3,286,122 | 11/1966 | Dietch | 315—8 |

JAMES W. LAWRENCE, *Primary Examiner.*

V. LAFRANCHI, *Assistant Examiner.*

U.S. Cl. X.R.

317—157.5